United States Patent
Burchard (10) Patent No.: US 11,138,389 B2
(45) Date of Patent: Oct. 5, 2021

(54) SYSTEM AND METHOD FOR COUPLED DETECTION OF SYNTAX AND SEMANTICS FOR NATURAL LANGUAGE UNDERSTANDING AND GENERATION

(71) Applicant: Goldman Sachs & Co. LLC, New York, NY (US)

(72) Inventor: Paul Burchard, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 168 days.

(21) Appl. No.: 16/557,520

(22) Filed: Aug. 30, 2019

(65) Prior Publication Data

US 2019/0384824 A1    Dec. 19, 2019

Related U.S. Application Data

(63) Continuation of application No. 15/814,323, filed on Nov. 15, 2017, now Pat. No. 10,402,499.

(60) Provisional application No. 62/508,175, filed on May 18, 2017, provisional application No. 62/433,727, filed on Dec. 13, 2016, provisional application No. 62/423,423, filed on Nov. 17, 2016.

(51) Int. Cl.
| | |
|---|---|
| *G06F 40/211* | (2020.01) |
| *G06F 40/284* | (2020.01) |
| *G06F 40/30* | (2020.01) |
| *G06F 40/56* | (2020.01) |

(52) U.S. Cl.
CPC ............ *G06F 40/56* (2020.01); *G06F 40/211* (2020.01); *G06F 40/284* (2020.01); *G06F 40/30* (2020.01)

(58) Field of Classification Search
CPC ...... G06F 40/20; G06F 40/205; G06F 40/211; G06F 40/279; G06F 40/284; G06F 40/289; G06F 40/30; G06N 3/0445
USPC ............................ 704/1, 9, 10; 706/18, 55
See application file for complete search history.

(56) References Cited

U.S. PATENT DOCUMENTS

| | | | |
|---|---|---|---|
| 5,111,398 A | 5/1992 | Nunberg et al. | |
| 5,406,480 A | 4/1995 | Kanno | |
| 7,702,599 B2* | 4/2010 | Widrow | G06N 3/02 706/18 |
| 7,809,551 B2* | 10/2010 | Sandor | G06F 16/35 704/9 |
| 8,214,196 B2 | 7/2012 | Yamada et al. | |
| 8,892,422 B1* | 11/2014 | Kumar | G06F 40/289 704/9 |
| 9,372,846 B1 | 6/2016 | Perkov | |

(Continued)

OTHER PUBLICATIONS

Desjardins et al., "An Auto-Associative Neural Network for Information Retrieval", 2006 International Joint Conference on Neural Networks, Jul. 16-21, 2006, pp. 3492 to 3498. (Year: 2006).*

(Continued)

*Primary Examiner* — Martin Lerner (57) ABSTRACT

A method includes performing, with at least one processing device, natural language understanding by iteratively (i) generating a semantic word and clause representation and (ii) generating a syntax. The generation of the semantic word and clause representation and the generation of the syntax occur iteratively such that (i) semantics are calculated from syntax by aggregating weights of syntactically-labeled context in which words or clauses appear and (ii) syntax is calculated from semantics by grouping common pairs of words or clauses with similar semantic relations, thereby producing a self-consistent coupled notion of syntax and semantics.

20 Claims, 5 Drawing Sheets

(56) References Cited

U.S. PATENT DOCUMENTS

| | | | |
|---|---|---|---|
| 9,633,002 B1* | 4/2017 | Balluru | G06N 20/00 |
| 10,402,499 B2 | 9/2019 | Burchard | |
| 10,685,189 B2* | 6/2020 | Burchard | G06F 40/30 |
| 2002/0046018 A1 | 4/2002 | Marcu et al. | |
| 2002/0087327 A1 | 7/2002 | Lee et al. | |
| 2003/0036898 A1 | 2/2003 | Duan et al. | |
| 2003/0182102 A1 | 9/2003 | Corston-Oliver et al. | |
| 2004/0083092 A1 | 4/2004 | Valles | |
| 2005/0108630 A1 | 5/2005 | Wasson et al. | |
| 2005/0228640 A1 | 10/2005 | Aue et al. | |
| 2006/0212431 A1* | 9/2006 | Lapir | G06F 16/90339 |
| 2006/0248053 A1 | 11/2006 | Sanfilippo et al. | |
| 2007/0136251 A1* | 6/2007 | Colledge | G06F 16/3338 |
| 2008/0126078 A1 | 5/2008 | Starkie | |
| 2008/0162109 A1 | 7/2008 | Strassner et al. | |
| 2008/0319735 A1 | 12/2008 | Kambhatla et al. | |
| 2009/0070459 A1 | 3/2009 | Cho et al. | |
| 2009/0089658 A1 | 4/2009 | Chiu et al. | |
| 2010/0318348 A1* | 12/2010 | Chelba | G06F 40/40 704/9 |
| 2011/0087483 A1 | 4/2011 | Hsieh et al. | |
| 2011/0119047 A1* | 5/2011 | Ylonen | G06F 40/30 704/9 |
| 2011/0125487 A1 | 5/2011 | Ylonen | |
| 2012/0226492 A1 | 9/2012 | Tsuboi et al. | |
| 2013/0031059 A1 | 1/2013 | Ravikumar et al. | |
| 2013/0185057 A1* | 7/2013 | Yoon | G06F 40/20 704/9 |
| 2014/0019385 A1 | 1/2014 | Dawson et al. | |
| 2014/0289715 A1 | 9/2014 | Meijer et al. | |
| 2015/0039316 A1 | 2/2015 | Tzirkel-Hancock et al. | |
| 2015/0170051 A1* | 6/2015 | Bufe, III | G06N 3/126 706/13 |
| 2015/0193431 A1* | 7/2015 | Stoytchev | G06F 40/40 704/9 |
| 2015/0278197 A1 | 10/2015 | Bogdanova | |
| 2015/0347393 A1 | 12/2015 | Futrell et al. | |
| 2015/0363176 A1 | 12/2015 | Sheng | |
| 2015/0379394 A1* | 12/2015 | Thaler | G06N 3/0454 706/20 |
| 2016/0012033 A1 | 1/2016 | Craymer, III | |
| 2016/0275573 A1 | 9/2016 | L'Huillier et al. | |
| 2017/0091312 A1* | 3/2017 | Ajmera | G06F 16/3329 |
| 2017/0103062 A1 | 4/2017 | Zhang et al. | |
| 2017/0116204 A1 | 4/2017 | Davulcu et al. | |
| 2018/0060304 A1 | 3/2018 | Bull et al. | |
| 2018/0137101 A1 | 5/2018 | Burchard | |

OTHER PUBLICATIONS

Coecke et al., "Mathematical Foundations for a Compositional Distributional Model of Meaning", Linguistic Analysis, vol. 36, Issue 1, Mar. 2010, 34 pages.

Danesh et al., "An Investigation of Recursive Auto-Associative Memory in Sentiment Detection", International Conference on Advanced Data Mining and Applications, 2011, pp. 162-174.

Erk et al., "A Structured Vector Space Model for Word Meaning in Context", Proceedings of the 2008 Conference on Empirical Methods in Natural Language Processing, Oct. 2008, 10 pages.

Gao et al., "The Use of Clustering Techniques for Language Modeling—Application to Asian Languages", International Journal of Computational Linguistics and Chinese Language Processing, vol. 6, No. 1, Feb. 2001, 28 pages.

Girshick et al., "Object Detection with Grammar Models", Advances in Neural Information Processing Systems 24 (NIPS 2011), Dec. 2011, 9 pages.

Hutto et al., "Vader: A Parsimonious Rule-based Model for Sentiment Analysis of Social Media Text", Association for the Advancement of Artificial Intelligence, 2014, 10 pages.

Krishnamurthy et al., "Vector Space Semantic Parsing: A Framework for Compositional Vector Space Models", Proceedings of the Workshop on Continuous Vector Space Models and their Compositionality, Aug. 2013, 10 pages.

Levy et al., "Dependency-Based Word Embeddings," Proceedings of the 52nd Annual Meeting of the Association for Computational Linguistics (Short Papers), Jun. 2014, 7 pages.

Mikolov et al., "Distributed Representations of Words and Phrases and their Compositionality", Advances in Neural Information Processing Systems, 2013, 9 pages.

Pado et al., "Dependency-Based Construction of Semantic Space Models", Computational Linguistics, 2007, 39 pages.

Poon et al., "Unsupervised Semantic Parsing", Proceedings of the 2009 Conference on Empirical Methods in Natural Language Processing, Aug. 2009, 10 pages.

Rumelhart et al., "Learning representations by back-propagating errors", Nature, vol. 323, Oct. 1986, 4 pages.

Sabour et al., "Dynamic Routing Between Capsules", 31st Conference on Neural Information Processing Systems (NIPS 2017), Oct. 2017, 11 pages.

Zhu et al., "Unsupervised Learning of Probabilistic Grammar-Markov Models for Object Categories", IEEE Transactions on Pattern Analysis and Machine Intelligence, vol. 31, No. 1, Jan. 2009, 15 pages.

International Search Report in connection with International Patent Application No. PCT/US17/61805 dated Feb. 9, 2018, 2 pages.

Written Opinion of the International Searching Authority in connection with International Patent Application No. PCT/US17/61805 dated Feb. 9, 2018, 10 pages.

Examination Report No. 1 for Standard Patent Application dated Dec. 11, 2020 in connection with Australian Patent Application No. 2017362314, 4 pages.

Official Action dated Dec. 22, 2020 in connection with Israeli Patent Application No. 266266, 4 pages.

* cited by examiner

FIG. 5

SYSTEM AND METHOD FOR COUPLED DETECTION OF SYNTAX AND SEMANTICS FOR NATURAL LANGUAGE UNDERSTANDING AND GENERATION

CROSS-REFERENCE TO RELATED APPLICATIONS AND PRIORITY CLAIM

This application claims priority under 35 U.S.C. § 120 as a continuation of U.S. patent application Ser. No. 15/814,323 filed on Nov. 15, 2017, which claims priority under 35 U.S.C. § 119(e) to the following applications:
 U.S. Provisional Patent Application No. 62/423,423 filed on Nov. 17, 2016;
 U.S. Provisional Patent Application No. 62/433,727 filed on Dec. 13, 2016; and
 U.S. Provisional Patent Application No. 62/508,175 filed on May 18, 2017. All of these applications are hereby incorporated by reference in their entirety.

TECHNICAL FIELD

This disclosure relates generally to natural language processing. More specifically, this disclosure relates to a system and method for coupled detection of syntax and semantics for natural language understanding and generation.

BACKGROUND

"Natural language processing" generally refers to machine learning technology or other computing technology that supports interactions between humans and machines using natural language. Natural language processing often involves natural language understanding and natural language generation. Natural language understanding generally refers to technology allowing a machine to disassemble and parse communications that are input using natural language so that the machine can identify the proper meanings of the input communications. Natural language generation generally refers to technology allowing a machine to generate communications that are output using natural language so that the output communications have the proper meanings.

Recent work on natural language processing has often focused on semantic embedding of words into vector spaces, where relations between words are represented as vector differences in these spaces. Techniques for semantic embedding of words into vector spaces are typically based on the relationship between a word and the contexts in which the word appears. For example, existing techniques may use, as vector coordinates, the coefficients of a neural network that predicts nearby words from a given word or that predicts a given word from nearby words.

SUMMARY

This disclosure provides a system and method for coupled detection of syntax and semantics for natural language understanding and generation.

In a first embodiment, a method includes performing, with at least one processing device, natural language understanding by iteratively (i) generating a semantic word and clause representation and (ii) generating a syntax. The generation of the semantic word and clause representation and the generation of the syntax occur iteratively such that (i) semantics are calculated from syntax by aggregating weights of syntactically-labeled context in which words or clauses appear and (ii) syntax is calculated from semantics by grouping common pairs of words or clauses with similar semantic relations, thereby producing a self-consistent coupled notion of syntax and semantics.

In a second embodiment, an apparatus includes at least one processing device and at least one memory storing instructions that, when executed by the at least one processing device, cause the at least one processing device to perform natural language understanding by iteratively (i) generating a semantic word and clause representation and (ii) generating a syntax. The generation of the semantic word and clause representation and the generation of the syntax occur iteratively such that the at least one processing device is configured to (i) calculate semantics from syntax by aggregating weights of syntactically-labeled context in which words or clauses appear and (ii) calculate syntax from semantics by grouping common pairs of words or clauses with similar semantic relations, thereby producing a self-consistent coupled notion of syntax and semantics.

In a third embodiment, a non-transitory computer readable medium contains instructions that, when executed by at least one processing device, cause the at least one processing device to perform natural language understanding by iteratively (i) generating a semantic word and clause representation and (ii) generating a syntax. The generation of the semantic word and clause representation and the generation of the syntax occur iteratively such that the at least one processing device is configured to (i) calculate semantics from syntax by aggregating weights of syntactically-labeled context in which words or clauses appear and (ii) calculate syntax from semantics by grouping common pairs of words or clauses with similar semantic relations, thereby producing a self-consistent coupled notion of syntax and semantics.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, recent work on natural language processing has often focused on semantic embedding of words into vector spaces, where relations between words are represented as vector differences in these spaces. However, the structure of a natural language is governed not just by its semantics but also by its syntax. "Semantics" generally refers to an understanding of the meanings or interpretations of words, while "syntax" generally refers to an understanding of the rules used to form phrases and sentences using those words. This disclosure shows how semantics can be improved through knowledge of syntax and how simultaneously syntax arises from knowledge of semantics to improve natural language processing in machines.

Moreover, techniques for semantic embedding of words into vector spaces are typically based on the relationship between a word and the contexts in which the word appears, such as by using the coefficients of a neural network that predicts nearby words from a given word or that predicts a given word from nearby words as vector coordinates. However, these techniques typically work on a fixed window and do not account for the syntactic structure of a language that can make some physically-distant words semantically closer to a given word. Similarly, natural language techniques based on n-grams consider a fixed window of n words to predict the next word. This disclosure describes how natural language processing in machines can be improved to account for such syntactic structures.

Figure 1:
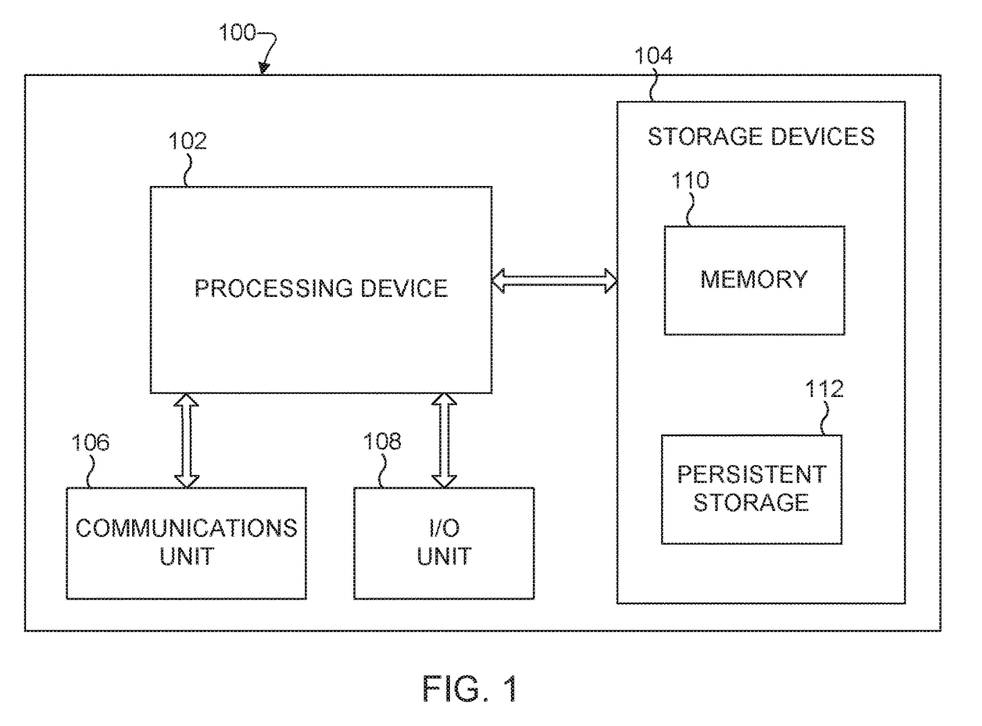
FIG. 1 illustrates an example system supporting coupled detection of syntax and semantics for natural language understanding and generation according to this disclosure.

FIG. 1 illustrates an example system 100 supporting coupled detection of syntax and semantics for natural language understanding and generation according to this disclosure. As shown in FIG. 1, the system 100 includes at least one processing device 102, at least one storage device 104, at least one communications unit 106, and at least one input/output (I/O) unit 108.

The processing device 102 executes instructions that may be loaded into a memory 110. The processing device 102 includes any suitable number(s) and type(s) of processors or other devices in any suitable arrangement. Example types of processing devices 102 include microprocessors, microcontrollers, digital signal processors, field programmable gate arrays, application specific integrated circuits, and discrete circuitry.

The memory device 110 and a persistent storage 112 are examples of storage devices 104, which represent any structure(s) capable of storing and facilitating retrieval of information (such as data, program code, and/or other suitable information on a temporary or permanent basis). The memory device 110 may represent a random access memory or any other suitable volatile or non-volatile storage device(s). The persistent storage 112 may contain one or more components or devices supporting longer-term storage of data, such as a read only memory, hard drive, Flash memory, or optical disc.

The communications unit 106 supports communications with other systems or devices. For example, the communications unit 106 could include a network interface card or a wireless transceiver facilitating communications over a wired or wireless network. The communications unit 106 may support communications through any suitable physical or wireless communication link(s).

The I/O unit 108 allows for input and output of data. For example, the I/O unit 108 may provide a connection for user input through a keyboard, mouse, keypad, touchscreen, microphone, or other suitable input device. The I/O unit 108 may also send output to a display, printer, speaker, or other suitable output device.

The instructions executed by the processing device 102, could include instructions that implement natural language processing, such as natural language understanding and/or natural language generation. For example, the instructions executed by the processing device 102 could include instructions that obtain data defining natural language input (such as from a local or remote microphone, over a network, or in any other suitable manner) and that analyzes the data in order to understand the natural language input. As another example, the instructions executed by the processing device 102 could include instructions that generate data defining natural language output (such as for a local or remote speaker, for transmission over a network, for display, or for use in any other suitable manner) and that outputs the data. The processing device 102 could implement the techniques described below in order to support natural language understanding and/or natural language generation.

Although FIG. 1 illustrates one example of a system 100 supporting coupled detection of syntax and semantics for natural language understanding and generation, various changes may be made to FIG. 1. For example, it is assumed here that the functionality for coupled detection of syntax and semantics is implemented using software/firmware executed by the processing device 102. However, any suitable hardware-only implementation or any suitable hardware and software/firmware implementation could be used to implement this functionality. Also, computing devices come in a wide variety of configurations, and FIG. 1 does not limit this disclosure to any particular device. In addition, natural language understanding and natural language generation could be supported in any number of devices or systems and are not limited to use with just computing devices.

Figure 2A:
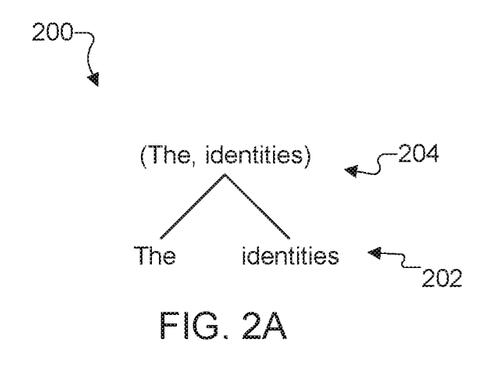
FIGS. 2A and 2B illustrate example syntax diagrams that can be generated or used by a system supporting coupled detection of syntax and semantics for natural language understanding according to this disclosure.
Figure 2B:
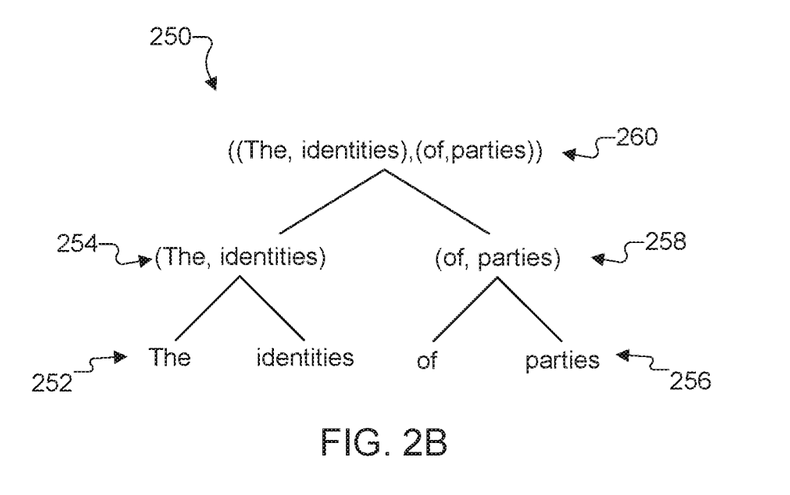

FIGS. 2A and 2B illustrate example syntax diagrams 200, 250 that can be generated or used by a system supporting coupled detection of syntax and semantics for natural language understanding according to this disclosure. Note that the syntax diagrams 200, 250 shown here are very simplistic but can be easily expanded. Also note that, for ease of explanation, FIGS. 2A and 2B are described as being generated or used by the system 100 of FIG. 1. However, any other suitable system could generate or use syntax diagrams.

As shown in FIG. 2A, the syntax diagram 200 illustrates how two words 202 ("The" and "identities") can be combined to form a single clause 204 ("The identities"). Similarly, the syntax diagram 250 illustrates how two words 252 ("The" and "identities") can be combined to form a first clause 254 ("The identities") and how two words 256 ("of" and "parties") can be combined to form a second clause 258 ("of parties"). Those clauses 254 and 258 (which are actually sub-clauses) can be combined to form a larger clause 260 ("The identities of parties").

Although FIGS. 2A and 2B illustrate examples of syntax diagrams 200, 250 that can be generated or used by a system supporting coupled detection of syntax and semantics for natural language understanding, various changes may be made to FIGS. 2A and 2B. For example, as noted above, these syntax diagrams are very simple but can be expanded as needed, and any number of syntax diagrams can be used in a system.

Using this type of nomenclature, natural language processing can occur as follows. As noted above, the structure of a natural language is governed by its semantics and its syntax. Thus, the following description describes generation of a semantic representation and generation of a syntax, which can then be used in order to support natural language understanding and/or natural language generation. Moreover, as described in more detail below, these are iterative steps in that the generation of the semantic representation and the generation of the syntax can be repeated, where each subsequent iteration is based on or uses the results from one or more prior iterations.

Generation of Semantic Representation

In order to obtain the necessary semantic representation in an unsupervised manner, suppose one already has a syntax in the form of a parse tree that breaks up words into clauses and sub-clauses. Various forms of parse trees and their generation are known in the art, instead of using physical distance to label context and determine its importance to a given word, a processing device can label the context with its syntactic relation to a given word and gauge its importance by syntactic distance in the parse tree. In some implementations, the semantic representation may be a high-dimensional vector embedding of a given word or clause and is constructed by accumulating a vector of weights associated with each item of syntactically-labeled context.

In some embodiments, the items of context used to generate the semantic representation may be words, together with information on the shape of the syntactic parse tree between the original word or clause and the context word. Each such context item is weighted by the number of occurrences of that context item, and each occurrence is weighted by a decaying function of the distance along the parse tree. In other embodiments, the items of context may be clauses represented by nodes in the parse tree along the path from the original word or clause to the root, together with syntactic information that the clause occurs before or after the original word or clause. Each such item is weighted by the number of occurrences of that context item, and each occurrence is weighted by a decaying function of the distance along the parse tree. Many other possible representations of syntactically-labeled context will be apparent to one of ordinary skill in the art.

Also, in some embodiments, it may be desirable to include semantic information based on the content of a clause as well as its context. As one approaches a root in a syntax tree, there is less context and more content available to characterize a clause's meaning. Each node in the syntax tree has a frequency defined by how often a word or clause occurs in some reference/training text. The intuition about how to characterize content is to understand a clause as a relatively unique syntactic arrangement of relatively non-unique sub-clauses, which can be referred to as the clause's essential components. To be more precise, the essential components of a clause can be obtained by going from a node of the syntax tree representing the clause toward the leaves of the syntax tree. This continues until (i) a leaf is reached or (ii) at least one of the node's children is not as common relative to the node as the node is to its parent (which can be expressed mathematically as min[freq(child)/freq(node)]<freq(node)/freq(parent), where min is taken over all children of the node). This procedure identifies "frequency elbows" along the path from the clause to the leaves. These essential components together can form a vector, where the weight of each essential component may be a complex exponential that makes one circuit around the origin along the sequence of essential components. The semantic representation being generated may then be constructed by accumulating a vector of weights associated with each item of syntactically-labeled context and content.

In particular embodiments, prior to aggregating the semantic information across instances of a word or clause, a disambiguation operation can be performed to separate instances that have different semantic meanings. To accomplish this, the instances of the word or clause may be clustered by the similarity of their syntactically-labeled context and/or content. For example, this may be accomplished using latent semantic analysis where (to use standard terminology) "documents" are replaced by instances of a word or clause, "terms" are replaced by items of syntactically-labeled context and/or content, and an "occurrences" matrix is replaced by the weight of each item of context and/or content for each instance of the word or clause.

Also, in particular embodiments, a lower-dimensional semantic representation of words and clauses may be obtained from the higher-dimensional ones described above using dimensional reduction techniques, such as sparse coding, auto-encoding neural networks, or random projection. Nevertheless, the original sparse but high-dimensional representation retains the most information for auditing or debugging the results of the technique.

Generation of Syntax

In order to obtain the necessary syntax in an unsupervised manner, suppose one already has a good semantic representation of words and clauses. Syntax should capture common semantic relations between sequential words and clauses (recall that in a vector embedding representation, semantic relations are represented by differences between vectors). A syntax tree can be accumulated iteratively by finding the most common semantic relation between adjacent words and clauses and turning each instance of this relation into a new atomic clause. The clause has its own semantics given by the contexts in which it appears. This represents a new sequence of words and clauses with known semantics, so this process can be repeated until an entire natural language input has been parsed. The result is both a parse tree for the natural language input and a frequency table of semantic relations that represent syntactic constructs.

In particular embodiments, if the given semantics are non-trivial, no two semantic relations between different adjacent words or clauses would typically be exactly the same. For the purpose of detecting syntax, this step need only look for semantic relations that are approximately the same. This detection can be performed efficiently, such as by using a variety of auto-associative memory techniques. In some embodiments, one such auto-associative technique is to obtain the memory cell for storing a semantic relation by finding the angularly nearest vector all of whose coordinates are selected only from the set +1, −1, and 0. This nearest vector can be efficiently computed from the semantic vector by sorting its coordinates from largest to smallest. Despite the simplicity of this technique, it is effective at preserving cosine similarity of the relations in high dimensions.

Iterative Generation of Semantic Representation and Syntax

These two steps (deriving semantics from syntax and deriving syntax from semantics) can be repeated any number of times, typically starting from trivial semantics and moving on to more complex semantics. These steps can be repeated so that the semantics and syntax are consistent and reinforce each other. Semantics can be calculated from syntax by aggregating weights of syntactically-tagged context in which a token (word or clause) appears. Syntax can be calculated from semantics by grouping the most common pairs of tokens with similar semantic relations. Once repeated a number of times, the process derives a self-consistent coupled notion of syntax and semantics.

To illustrate the first step of this iterative process, start with trivial semantics in which each word has its own independent semantics. Then, the first version of the syntax works as follows. The most common pair of words is grouped into one token, the most common pair of resulting tokens (words or pairs already created) is grouped into one token, and so on. This can stop when all pairs have a frequency of one. This is a very natural operation, as the human brain is very sensitive to words or combinations of words being used together and can comprehend such groups as a unit for further aggregation.

To illustrate the next step, any syntactic understanding, such as one that the first step has produced, can also be used to boost semantic understanding. For example, in a word embedding technique, instead of looking at occurrences of words in some fixed window of context as is normally done, the parse tree obtained in the previous step can be considered to define the context. In this distribution, the syntactic relationships of the context words are taken into account for a given word, such as to decay the weights by syntactic (rather than lexical) distance.

Uses of Semantic Representation and Syntax

Once semantics and syntax are modeled, they can be used in natural language understanding and generation. For example, the semantics and syntax can be used in natural language generation by pushing words onto a stack based on semantics, such as by using predictions based on the semantic representation of words or clauses already on the stack. Words or clauses can then be popped off the stack in order to replace the words with clauses or to replace the clauses with larger clauses when the top items on the stack have a known syntactic relation (where relations are represented as differences in a vector representation).

Figure 3:
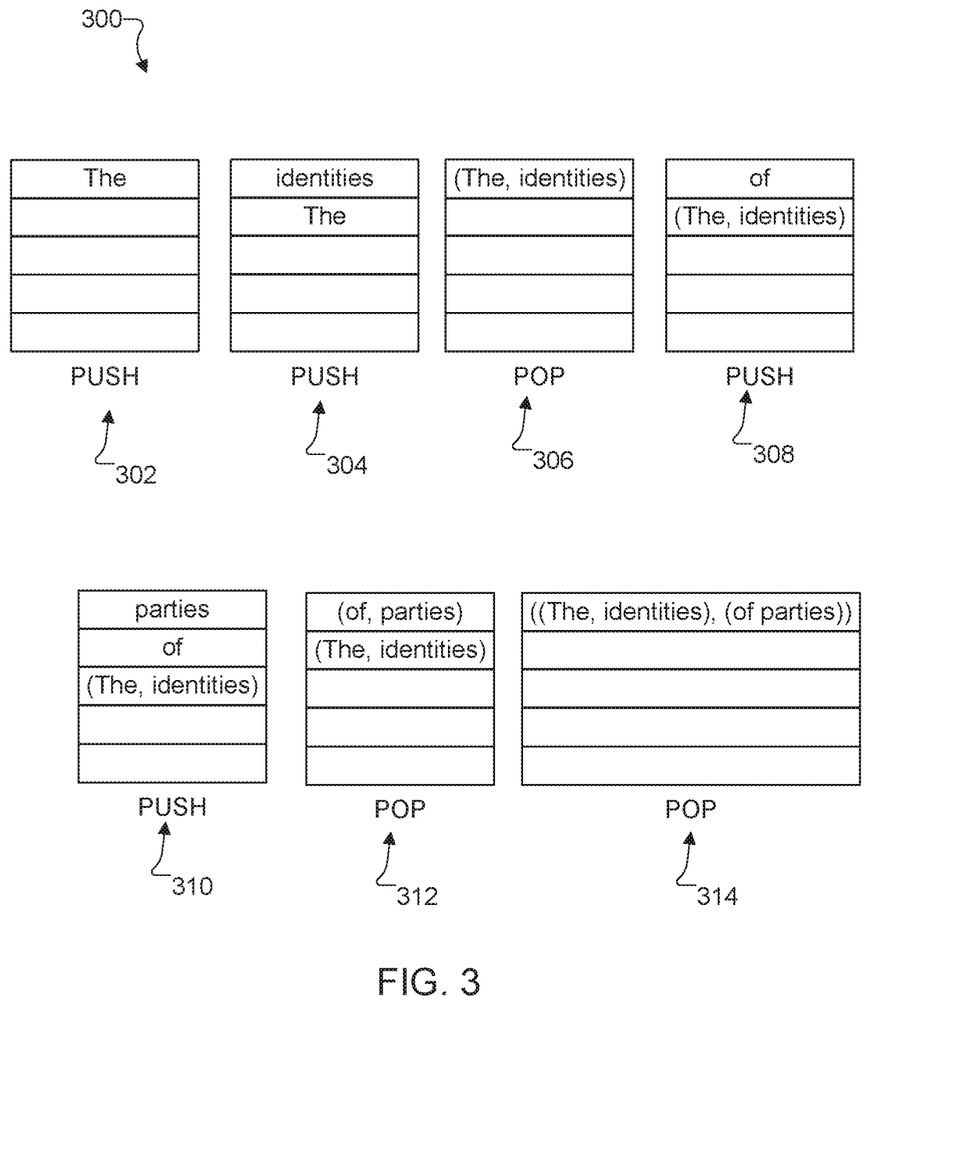
FIG. 3 illustrates an example series of stack operations supporting coupled detection of syntax and semantics for natural language generation according to this disclosure.

FIG. 3 illustrates an example series 300 of stack operations 302-314 supporting natural language generation following coupled detection of syntax and semantics according to this disclosure. As shown in FIG. 3, the stack operations 302-304 involve pushing two words onto a stack, and the stack operation 306 pops or combines these words into a single clause. Similarly, the stack operations 308-310 involve pushing two more words onto the stack, and the stack operation 312 pops or combines those words into another clause. The stack operation 314 then combines the two clauses into a single larger clause.

Since the future context of a specific word or clause is most predictive of the words that should be pushed onto the stack on top of the specific word or clause, accuracy can be increased by only retaining the part of the semantic representation coming from the future context when deciding what word to push onto the stack next. Since the context is syntactically-labeled, it is possible to determine which context comes from the past and which context comes from the future. Note that the decisions on what to push based on semantics of the top several items of the stack are analogous to classic clustered n-gram methods, except that now the top items of the stack that predict the next word may be arbitrarily long clauses, thereby capturing long-range dependencies missed by the classic n-gram methods.

To match the complexity of real language, the popping of words and clauses need not be performed deterministically. Sometimes, it is better to pass up a low-probability syntactic relation in order to wait for a subsequent higher-probability one. This non-determinism can be achieved in various ways, such as by randomizing the production of pop operations or by re-parsing the top several items on the stack every so often.

Although FIG. 3 illustrates one example of a series 300 of stack operations supporting coupled detection of syntax and semantics for natural language generation, various changes may be made to FIG. 3. For instance, any number of words and tokens could appear in a stack.

Accuracy Improvements

Thus far, purely unsupervised learning techniques have been described. However, the accuracy of language understanding can be further enhanced with the introduction of some simple supervised enhancement techniques. In some embodiments, one such supervised technique uses a human-generated lexicon of amplifiers. Amplifiers are words or clauses that strengthen (such as "very"), weaken (such as "slightly"), or even invert (such as "not") the relation between two words or clauses, such as between a given word or clause and another word or clause in its context. The lexicon of amplifiers may include, for each word or clause, a positive or negative multiplier for the weight of the relationship. When generating a semantic representation, the weight of a particular item of context can be multiplied by the amplifier weights of relevant amplifying words or clauses along the parse tree between the original word or clause and the context item. In this way, using the sentence "Monday is not fun" as an example, the word "fun" in the context of the word "Monday" would have a negative weight because of the amplifier "not" along the parse path between "Monday" and "fun."

Another supervised enhancement technique can be used to detect sentiment. Supervision may be used here because words of opposite sentiment often appear in similar contexts ("the food tasted good" and "the food tasted bad"). Nevertheless, the sentiment of a single passage is usually self-consistent once amplifiers are taken into account. Thus, the sentiment of a word or clause can be better detected by focusing only on its emotional context. This may involve the use of a human-generated lexicon of emotional words and clauses. Given this lexicon, the sentiment of a word or clause is the component of the semantics generated by the emotional context items (in some embodiments, weighted using amplifiers as described above). A numerical sentiment score can also be derived from the cosine similarity of this vector with the vector defined by the sentiment lexicon.

More generally, various properties of words or clauses, such as parts of speech, may be detected using semantic co-vectors. An inner product of a co-vector with a semantic vector is then a number measuring the property. Like semantic vectors, the co-vectors have coefficients corresponding to context items. Unlike the semantic vectors (which tend to be high-dimensional but sparse), the co-vectors may be high-dimensional but patterned. This means that while the overall number of different coefficient values is small, each coefficient value may be repeated across a large number of context items that share some semantic property. For example, in part of speech detection, the co-vectors might have coefficients that are repeated across all items of context that have the same part of speech. This allows recursive detection of parts of speech by their syntactic relations with other parts of speech.

Methods for Natural Language Understanding and Generation

Figure 4:
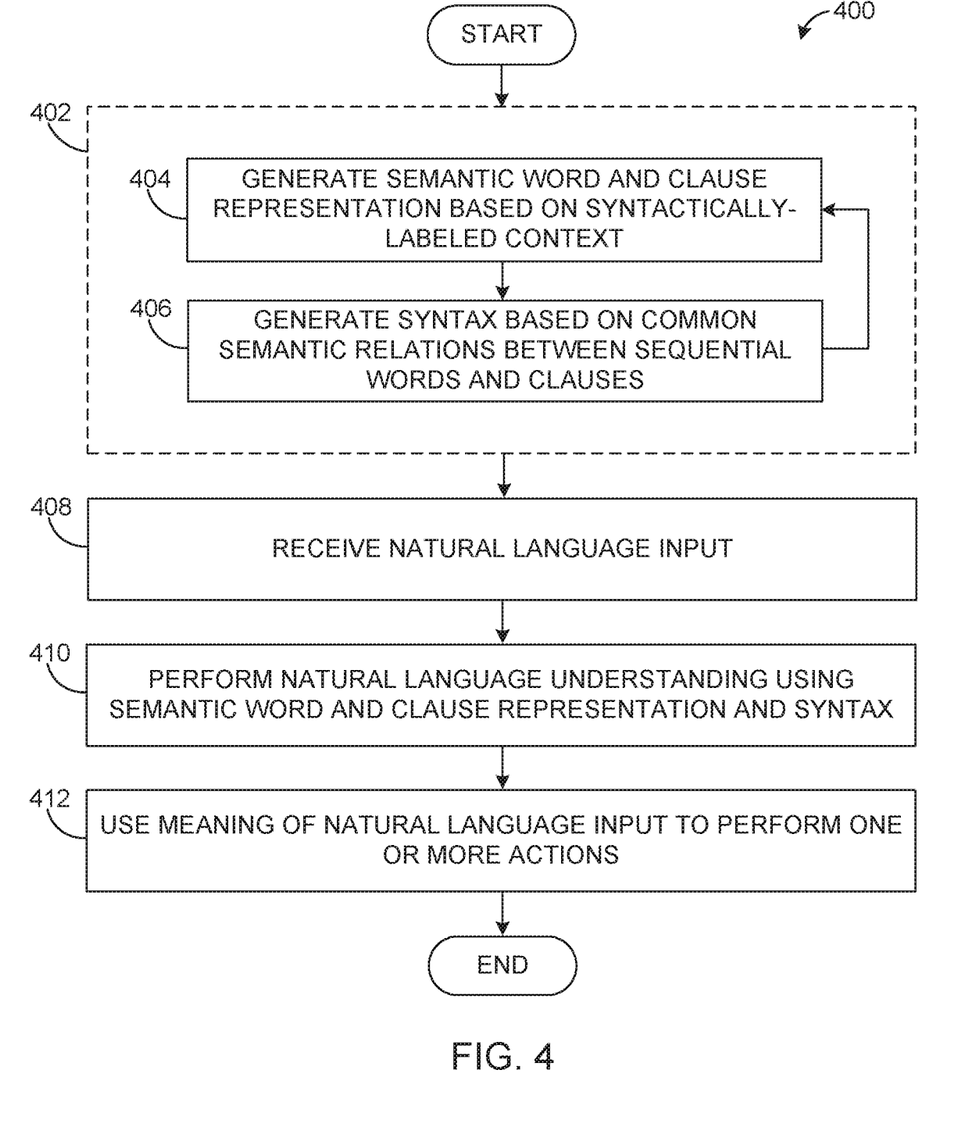
FIG. 4 illustrates an example method for natural language understanding based on coupled detection of syntax and semantics according to this disclosure.

FIG. 4 illustrates an example method 400 for natural language understanding based on coupled detection of syntax and semantics according to this disclosure. For ease of explanation, the method 400 of FIG. 4 is described as being performed using the system 100 of FIG. 1. However, the method 400 could involve the use of any other suitable device or system.

As shown in FIG. 4, an iterative process occurs in step 402, where a semantic word and clause representation based on syntactically-labeled context is generated at step 404 and a syntax based on common semantic relations between sequential words and clauses is generated at step 406. This could include, for example, the processing device 102 of the system 100 analyzing reference/training text to iteratively generate both a semantic word and clause representation and a syntax that are consistent and reinforce each other.

As noted above, to generate the semantic word and clause representation in step 404, an initial syntax in the form of a parse tree that breaks up words into clauses and sub-clauses could be used. The semantic representation can be constructed by accumulating a vector of weights associated with each item of syntactically-labeled context. During this process, a significance of particular items of context can be modified by the presence of words or clauses from a given lexicon of amplifiers along a syntax tree, and instances of particular items of context that have different semantic meanings can be separated by clustering instances of words and clauses based on similarity of syntactically-labeled context. The semantic representation could also be based on content. Content semantics can be constructed from the closest nodes in the syntax tree to a clause, where each of the closest nodes has the property that one of the node's children is not as common relative to the node as the node is to its parent. Also, as noted above, to generate the syntax in step 406, a syntax tree can be accumulated iteratively by finding the most common semantic relation between adjacent words and clauses and turning each instance of this relation into a new atomic clause, which has its own semantics given by the contexts in which it appears. This process can be repeated to obtain a parse tree and a frequency table of semantic relations that represent syntactic constructs. Here, multiple semantic relations can be considered equivalent if the semantic relations have identical representations, such as in an auto-associative memory.

A natural language input is received at step 408, and natural language understanding is performed using the semantic word and clause representation and the syntax at step 410. This could include, for example, the processing device 102 of the system 100 obtaining data defining a natural language input, such as from a local or remote microphone, over a network, or in any other suitable manner. This could also include the processing device 102 of the system 100 using the semantic word and clause representation and the syntax to break down the natural language input and identify its meaning. As part of the natural language understanding, a sentiment of a word or clause can be measured based only on components of the semantic word and clause representation coming from emotional context according to a given lexicon of emotional words and clauses. Also, properties of words and clauses can be determined by calculating inner products of semantic vectors and semantic co-vectors, where the semantic vectors and semantic co-vectors include coefficients corresponding to context items. The semantic vectors can be sparse vectors, and the semantic co-vectors can be patterned vectors with coefficient values that are repeated across context items sharing a semantic property.

The meaning of the natural language input can be used to perform one or more actions at step 412. For example, if the meaning of the natural language input is a request for information, this could include the processing device 102 of the system 100 obtaining and providing the requested information. If the meaning of the natural language input is a request to change operation of some device or system, this could include the processing device 102 of the system 100 initiating the operational change in the device or system. Any other or additional actions could occur depending on the natural language input and the design of the device or system that uses the natural language input.

Although FIG. 4 illustrates one example of a method 400 for natural language understanding based on coupled detection of syntax and semantics, various changes may be made to FIG. 4. For example, while shown as a series of steps, various steps in FIG. 4 could overlap, occur in parallel, or occur any number of times. Also, different devices or systems could be used to perform different steps in FIG. 4. As a particular example, one device could perform steps 402-406 to generate the semantic representation and the syntax, and another device could use the semantic representation and the syntax to process one or more natural language inputs.

Figure 5:
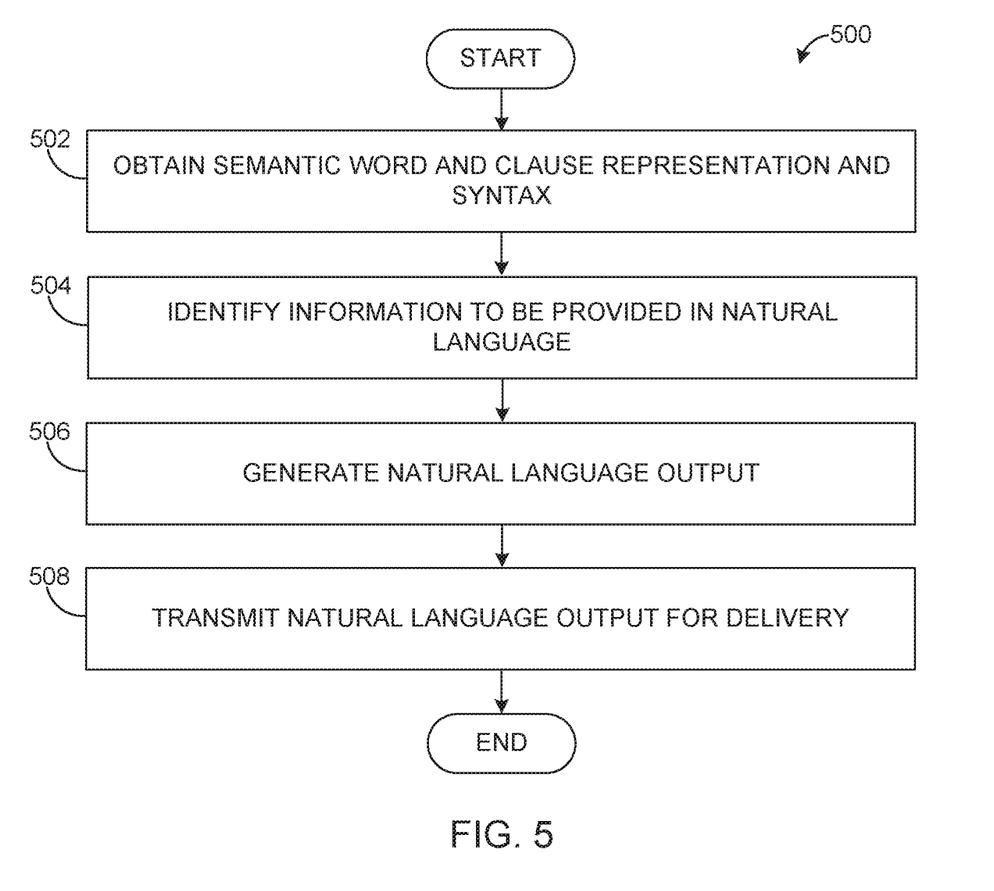
FIG. 5 illustrates an example method for natural language generation based on coupled detection of syntax and semantics according to this disclosure.

FIG. 5 illustrates an example method 500 for natural language generation based on coupled detection of syntax and semantics according to this disclosure. For ease of explanation, the method 500 of FIG. 5 is described as being performed using the system 100 of FIG. 1. However, the method 500 could involve the use of any other suitable device or system.

As shown in FIG. 5, a semantic word and clause representation and a syntax are obtained at step 502. This could include, for example, the processing device 102 of the system 100 obtaining a semantic representation and a syntax that are generated as described above with respect to FIG. 4. The semantic representation and the syntax could be generated by the system 100 performing the method 500, or the semantic representation and the syntax could be generated by another device and provided to the system 100 performing the method 500.

Information to be provided in a natural language is identified at step 504. This could include, for example, the processing device 102 of the system 100 generating or otherwise obtaining information that is to be provided to one or more users in a natural language format. The information being provided can vary widely based on the application.

A natural language output is generated at step 506. This could include, for example, the processing device 102 of the system 100 using the semantic word and clause representation and the syntax to generate a natural language output that conveys the information to be provided. As part of the natural language generation, words can be pushed onto a stack based on the semantic word and clause representation and based on words and clauses already on the stack. Also, words and clauses can be popped off the stack and be replaced by clauses based on the syntax.

The natural language output is transmitted for delivery at step 508. This could include, for example, the processing device 102 of the system 100 using the natural language output to generate audio at a local or remote speaker, displaying the natural language output on a monitor, or transmitting the natural language output over a network. The natural language output could be used in any other suitable manner.

Although FIG. 5 illustrates one example method of a 500 for natural language generation based on coupled detection of syntax and semantics, various changes may be made to FIG. 5. For example, while shown as a series of steps, various steps in FIG. 5 could overlap, occur in parallel, or occur any number of times. Also, the device performing the method 500 could also perform part or all of the method 400 in order to generate the semantic representation and the syntax and/or to perform natural language understanding. This may allow, for instance, the system 100 to engage in natural language communications with one or more users, where the system 100 uses natural language understanding to receive inputs from the users and natural language generation to generate outputs for the users.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
performing, with at least one processing device, natural language understanding by iteratively (i) generating a semantic word and clause representation and (ii) generating a syntax,
wherein generating the syntax comprises using an auto-associative technique to identify a memory cell for storing a semantic relation by finding an angularly nearest vector for a particular semantic vector, and
wherein the generation of the semantic word and clause representation and the generation of the syntax occur iteratively such that (i) semantics are calculated from syntax by aggregating weights of syntactically-labeled context in which words or clauses appear and (ii) syntax is calculated from semantics by grouping common pairs of words or clauses with similar semantic relations, thereby producing a self-consistent coupled notion of syntax and semantics.

2. The method of claim 1, wherein generating the semantic word and clause representation comprises:
obtaining an initial syntax represented by a parse tree;
weighting each item of syntactically-labeled context based on a number of occurrences; and
weighting each occurrence of each item of syntactically-labeled context based on a decaying function of distance along the parse tree.

3. The method of claim 2, wherein generating the semantic word and clause representation further comprises:
using amplifiers along the parse tree, each amplifier representing a specific word or clause that strengthens, weakens, or inverts a relationship between two other words or clauses, each amplifier having a positive or negative multiplier for a weight of the associated relationship.

4. The method of claim 3, wherein generating the semantic word and clause representation further comprises:
measuring sentiments of words or clauses based on emotional context items and the amplifiers.

5. The method of claim 1, further comprising:
determining parts of speech for words and clauses by calculating inner products of semantic vectors and semantic co-vectors, the semantic vectors and semantic co-vectors comprising coefficients corresponding to items of syntactically-labeled context, the semantic co-vectors comprising coefficients that are repeated across all items of syntactically-labeled context having a common part of speech.

6. The method of claim 1, wherein generating the syntax further comprises:
producing a parse tree and a frequency table of semantic relations that represent syntactic constructs.

7. The method of claim 1, wherein the natural language understanding is performed on a natural language input comprising received audio data.

8. An apparatus comprising:
at least one processing device; and
at least one memory storing instructions that, when executed by the at least one processing device, cause the at least one processing device to perform natural language understanding by iteratively (i) generating a semantic word and clause representation and (ii) generating a syntax, wherein the instructions that when executed cause the at least one processing device to generate the syntax comprise instructions that when executed cause the at least one processing device to use an auto-associative technique to identify a memory cell for storing a semantic relation by finding an angularly nearest vector for a semantic vector, and wherein the generation of the semantic word and clause representation and the generation of the syntax occur iteratively such that the at least one processing device is configured to (i) calculate semantics from syntax by aggregating weights of syntactically-labeled context in which words or clauses appear and (ii) calculate syntax from semantics by grouping common pairs of words or clauses with similar semantic relations, thereby producing a self-consistent coupled notion of syntax and semantics.

9. The apparatus of claim 8, wherein the instructions that when executed cause the at least one processing device to generate the semantic word and clause representation comprise:

instructions that when executed cause the at least one processing device to:
obtain an initial syntax represented by a parse tree;
weight each item of syntactically-labeled context based on a number of occurrences; and
weight each occurrence of each item of syntactically-labeled context based on a decaying function of distance along the parse tree.

10. The apparatus of claim 9, wherein the instructions that when executed cause the at least one processing device to generate the semantic word and clause representation further comprise:

instructions that when executed cause the at least one processing device to use amplifiers along the parse tree, each amplifier representing a specific word or clause that strengthens, weakens, or inverts a relationship between two other words or clauses, each amplifier having a positive or negative multiplier for a weight of the associated relationship.

11. The apparatus of claim 10, wherein the instructions that when executed cause the at least one processing device to generate the semantic word and clause representation further comprise:

instructions that when executed cause the at least one processing device to measure sentiments of words or clauses based on emotional context items and the amplifiers.

12. The apparatus of claim 8, wherein the instructions when executed further cause the at least one processing device to:

determine parts of speech for words and clauses based on inner products of semantic vectors and semantic co-vectors, the semantic vectors and semantic co-vectors comprising coefficients corresponding to items of syntactically-labeled context, the semantic co-vectors comprising coefficients that are repeated across all items of syntactically-labeled context having a common part of speech.

13. The apparatus of claim 8, wherein the instructions that when executed cause the at least one processing device to generate the syntax further comprise:

instructions that when executed cause the at least one processing device to produce a parse tree and a frequency table of semantic relations that represent syntactic constructs.

14. The apparatus of claim 8, wherein the at least one processing device is configured to perform the natural language understanding on a natural language input comprising received audio data.

15. A non-transitory computer readable medium containing instructions that, when executed by at least one processing device, cause the at least one processing device to:

perform natural language understanding by iteratively (i) generating a semantic word and clause representation and (ii) generating a syntax, wherein the instructions that when executed cause the at least one processing device to generate the syntax further comprise instructions that when executed cause the at least one processing device to use an auto-associative technique to identify a memory cell for storing a semantic relation by finding an angularly nearest vector for a semantic vector, and wherein the generation of the semantic word and clause representation and the generation of the syntax occur iteratively such that the at least one processing device is configured to (i) calculate semantics from syntax by aggregating weights of syntactically-labeled context in which words or clauses appear and (ii) calculate syntax from semantics by grouping common pairs of words or clauses with similar semantic relations, thereby producing a self-consistent coupled notion of syntax and semantics.

16. The non-transitory computer readable medium of claim 15, wherein the instructions that when executed cause the at least one processing device to generate the semantic word and clause representation comprise:

instructions that when executed cause the at least one processing device to:
obtain an initial syntax represented by a parse tree;
weight each item of syntactically-labeled context based on a number of occurrences; and
weight each occurrence of each item of syntactically-labeled context based on a decaying function of distance along the parse tree.

17. The non-transitory computer readable medium of claim 16, wherein the instructions that when executed cause the at least one processing device to generate the semantic word and clause representation further comprise:

instructions that when executed cause the at least one processing device to use amplifiers along the parse tree, each amplifier representing a specific word or clause that strengthens, weakens, or inverts a relationship between two other words or clauses, each amplifier having a positive or negative multiplier for a weight of the associated relationship.

18. The non-transitory computer readable medium of claim 17, wherein the instructions that when executed cause the at least one processing device to generate the semantic word and clause representation further comprise:

instructions that when executed cause the at least one processing device to measure sentiments of words or clauses based on emotional context items and the amplifiers.

19. The non-transitory computer readable medium of claim 15, wherein the instructions when executed further cause the at least one processing device to:

determine parts of speech for words and clauses based on inner products of semantic vectors and semantic co-vectors, the semantic vectors and semantic co-vectors comprising coefficients corresponding to items of syntactically-labeled context, the semantic co-vectors comprising coefficients that are repeated across all items of syntactically-labeled context having a common part of speech.

20. The non-transitory computer readable medium of claim 15, wherein the instructions that when executed cause the at least one processing device to generate the syntax further comprise:
  instructions that when executed cause the at least one processing device to produce a parse tree and a frequency table of semantic relations that represent syntactic constructs.

* * * * *